F. O. BECKMAN.
CORN PLANTER HARROW.
APPLICATION FILED JULY 14, 1916.

1,207,473.

Patented Dec. 5, 1916.

Inventor
F. O. Beckman

By T. K. Bryant
Attorney

UNITED STATES PATENT OFFICE.

FRITZ O. BECKMAN, OF GRUNDY CENTER, IOWA.

CORN-PLANTER HARROW.

1,207,473.

Specification of Letters Patent.

Patented Dec. 5, 1916.

Application filed July 14, 1916. Serial No. 109,297.

*To all whom it may concern:*

Be it known that I, FRITZ O. BECKMAN, a citizen of the United States, residing at Grundy Center, in the county of Grundy and State of Iowa, have invented certain new and useful Improvements in Corn-Planter Harrows, of which the following is a specification.

This invention relates to certain new and useful improvements in corn planter harrows.

The primary object of the invention is the provision of a harrow attachment adapted to be removably mounted upon any form of planter such as a corn planter whereby the tracks left by the planter wheels and draft animals will be completely covered during the forward movement of the planter.

A further object of the device is the provision of a drag harrow adjustably mounted for following a planter whereby any tracks or furrows left by the planter will be obliterated, thus preventing storms from disturbing the planted grain and corn and providing a better seed bed with the seed more perfectly covered in the complete planting operation.

A still further object is to provide a removable drag harrow upon a planter formed in separate parts for following the wheels of the planter, means being provided for elevating the harrow to its inoperative position when not desired for use.

With these general objects in view and others that will appear as the nature of the invention is better understood, the same consists in the novel construction, combination and arrangement of parts hereinafter more fully described, illustrated in the accompanying drawings, and then claimed.

Figure 1:
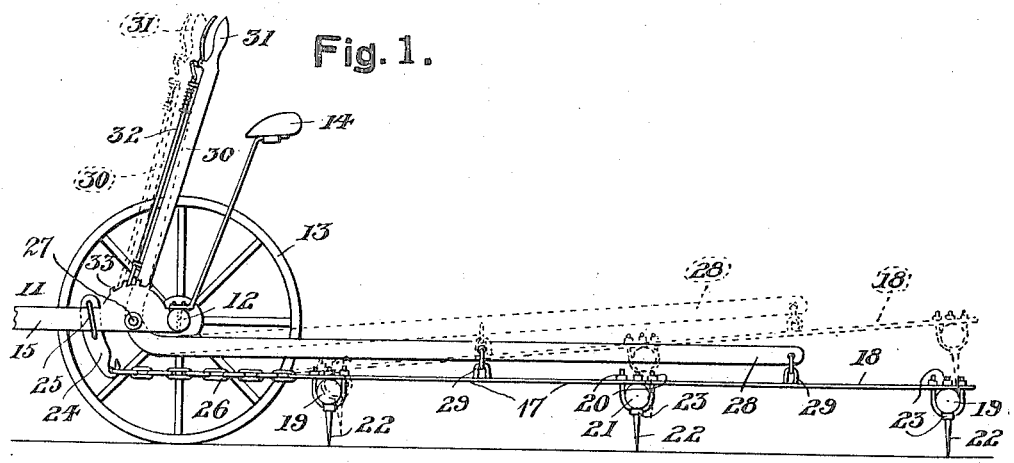
Figure 2:
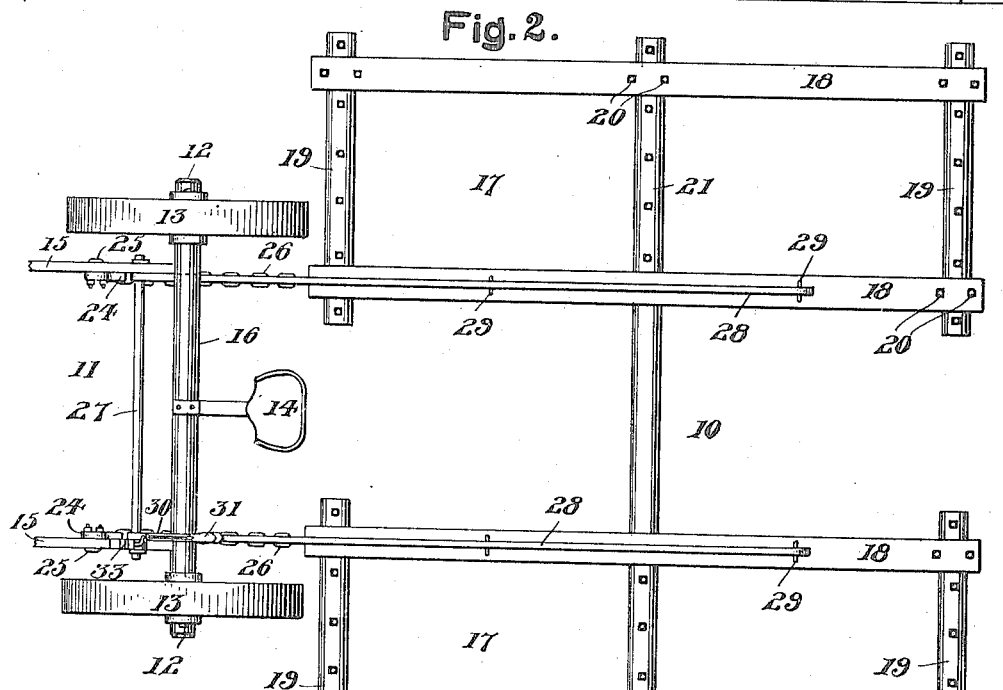
Figure 3:
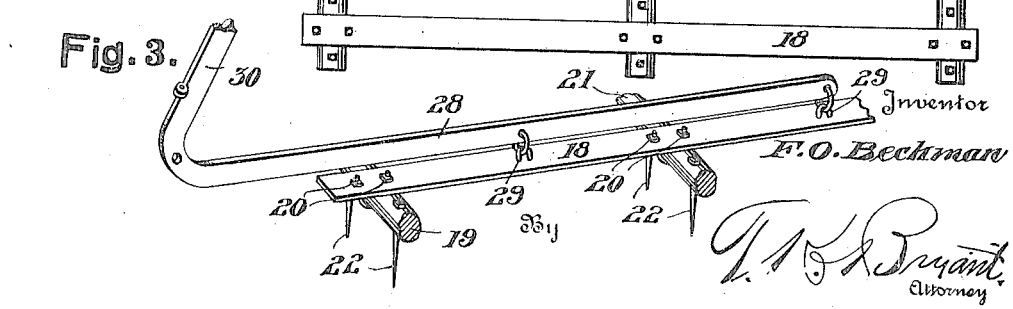

In the drawings forming a part of this application and in which like designating characters refer to corresponding parts throughout the several views:—Figure 1 is a side elevation of the device mounted upon a planter, a portion of the latter being illustrated and the device being indicated by dotted lines in its elevated inoperative position. Fig. 2 is a top plan view thereof, and, Fig. 3 is a perspective detail view of a portion of the device illustrating the lever mounting means detached and parts broken away.

The present double harrow or drag 10 is designed as an attachment readily secured in operative position for traveling in the rear of any form of planter, the same being herein illustrated in connection with a potato planter 11 having a rear axle 12, ground wheels 13, a driver's seat 14 and forwardly projecting frame bars 15, the latter extending forwardly from the said axle. The harrow 10 consists of two identical portions 17 each provided with longitudinally-extending flat bars 18 secured upon cylindrical cross bars 19 by means of clevises 20, the central cross bar 21 of each section 17 extending transversely of the bars 18 and being of sufficient length between the two sections to properly space the sections apart for positioning one of the sections in line with the planter wheels 13 when the harrow is placed rearwardly of the planter as illustrated in Fig. 2 of the drawing.

The beams 19 are each provided with a plurality of teeth or points 22 extending therethrough and having securing nuts 23 at opposite sides of the beams 19.

Downwardly projecting hooks 24 are removably attached to the planter frame bars 15 by means of clamps or clevises 25, drag chains 26 being connected between the lower ends of the hooks 24 and the forward ends of the central pair of said flat bars 18 whereby the harrow will be forwardly propelled during the movement of the planter.

A rock shaft 27 is removably journaled through the frame bars 15 of the planter and is arranged with hanger rods 28 secured thereto at points inwardly and adjacent the said frame bars 15. The rods 28 are curved at their forward ends for providing sufficient clearance to extend freely beneath the planter axle 12, the said rods being linked to the middle pair of harrow bars 18 by means of suitable links 29 at points centrally between the transverse beam 21 and the terminal beams 19 of each of the harrow sections 17.

One of the rods 28 is provided with an upwardly-extending lever 30 terminating in a handle 31 at its free end adapted to be readily grasped by the driver of the planter positioned upon the seat 14 during the operation of the device. The lever 30 is preferably provided with a locking member 32 adapted to engage the teeth of a segment rack 33 carried by the adjacent planter bar 15 for maintaining the lever 30 and the rods 28 elevated with the harrow in its inoperative position as illustrated by dotted lines in Fig. 1.

From this detailed description of the device it will be understood that the present harrow may be readily attached to any other form of planter for drawing the sections 17 forwardly at the rear of the planter wheels 13, thereby smoothing over the soil after the travel of the draft animals and the planter thereover.

The present device is simple in construction as well as being strong and durable, rendering more perfect the planting operation, and provides a serviceable device.

While the form of the invention herein shown and described is what is believed to be the preferred embodiment thereof, it is nevertheless to be understood that various forms, modifications and arrangement of the parts may be made without departing from the spirit and scope of the invention as claimed.

What I claim as new is:—

1. A harrow attachment for planters comprising removably mounted hooks and operating rods, a harrow formed of two sections linked to the said rods, draft connections between the said harrow sections and hooks, and adjustable tilting means for the said rods.

2. A harrow attachment comprising in combination with a planter frame, depending hooks removably clamped to the said frame, oppositely arranged mounting rods pivoted to the said frame in substantially the same plane as the said hooks, rigidly connected separated harrow sections linked to the said rods, flexible connections between the said hooks and sections, and tilting means for the said rods.

3. A device of the class described comprising a planter frame having an axle and ground wheels mounted upon the said axle, a shaft journaled transversely of the said frame, mounting rods rigidly attached to the said shaft having curved forward ends and extending rearwardly beneath the said axle, a harrow having opposite sections positioned rearwardly of the said wheels, and link supporting connections between the said harrow sections and rods.

4. A harrow of the class described comprising a planter frame having an axle and ground wheels mounted upon the said axle, a shaft journaled transversely of the said frame, mounting rods rigidly attached to the said shaft having curved forward ends and extending rearwardly beneath the said axle, a harrow having opposite sections positioned rearwardly of the said wheels, link supporting connections between the said harrow sections and rods, depending hooks removably attached to the said frame in substantially the same plane as the said rods, draft chains between the lower ends of the said hooks and the forward ends of each harrow section, the said chains being arranged beneath the said curved portions of the rods, an operating lever extension carried by one of the said rods, and adjustable retaining means carried by the said lever.

5. A device of the class described comprising in combination with a planter having a rear axle and ground wheels mounted thereon, forwardly projecting frame bars carried by the said axle, depending hooks removably carried by the inner faces of the said bars, a shaft journaled through the said bars between the said hooks and axle, mounting rods secured to the said shaft and extending rearwardly beneath the said axle, spaced harrow sections freely linked to the said rods rearwardly of the said wheels, draft chains connecting the said hooks and sections, and adjustable elevating means for the sections carried by one of the said rods at a point adjacent the driver's seat of the planter.

In testimony whereof I affix my signature.

FRITZ O. BECKMAN.